(12) United States Patent
Aoki et al.

(10) Patent No.: US 9,025,917 B2
(45) Date of Patent: May 5, 2015

(54) OPTICAL CONNECTOR

(75) Inventors: Tsuyoshi Aoki, Machida (JP); Shigenori Aoki, Atsugi (JP); Hidenobu Muranaka, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 262 days.

(21) Appl. No.: 13/534,261

(22) Filed: Jun. 27, 2012

(65) Prior Publication Data
US 2013/0071063 A1 Mar. 21, 2013

(30) Foreign Application Priority Data

Sep. 15, 2011 (JP) ................................. 2011-202444

(51) Int. Cl.
G02B 6/32 (2006.01)
(52) U.S. Cl.
CPC . *G02B 6/32* (2013.01); *G02B 6/327* (2013.01)
(58) Field of Classification Search
USPC ..................................................... 385/33, 93
See application file for complete search history.

(56) References Cited

U.S. PATENT DOCUMENTS

| 5,181,265 | A * | 1/1993 | Nishiwaki et al. | 385/33 |
| 2001/0036343 | A1* | 11/2001 | Okochi et al. | 385/92 |
| 2006/0056779 | A1* | 3/2006 | Wang | 385/92 |
| 2011/0158588 | A1 | 6/2011 | Little et al. | |
| 2011/0243504 | A1* | 10/2011 | Matsui | 385/74 |

FOREIGN PATENT DOCUMENTS

| JP | 62-193209 | 12/1987 |
| JP | 62-193209 U | 12/1987 |
| JP | 5-323151 | 12/1993 |
| JP | 2000147324 A | 5/2000 |
| TW | 201044044 | 12/2010 |
| TW | M411024 | 9/2011 |

OTHER PUBLICATIONS

Taiwanese Office Action mailed Mar. 24, 2014 in counterpart application No. 10112423 with English translation.
Taiwanese Office Action mailed Feb. 19, 2014 in counterpart application No. 101124237 with English translation.
Japanese Office Action dated Mar. 3, 2015. Patent Application No. 2011-202444.
Japanese Office Action dated Mar. 3, 2015. Patent Application No. 2011-202444 with Partial Translation.

* cited by examiner

*Primary Examiner* — Uyen Chau N Le
*Assistant Examiner* — Chad Smith
(74) *Attorney, Agent, or Firm* — Kratz, Quintos & Hanson, LLP

(57) ABSTRACT

An optical connector includes: a holding member that holds an optical transmission line; a lens member that has a lens; a concavo-convex structure provided between the holding member and the lens member; and a moving member that moves the concavo-convex structure between a first state where a protrusion and a recess of the concavo-convex structure are engaged with each other and a second state where a gap is formed between the protrusion and the recess.

14 Claims, 16 Drawing Sheets

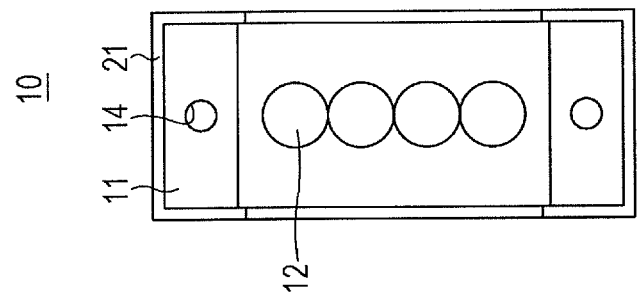
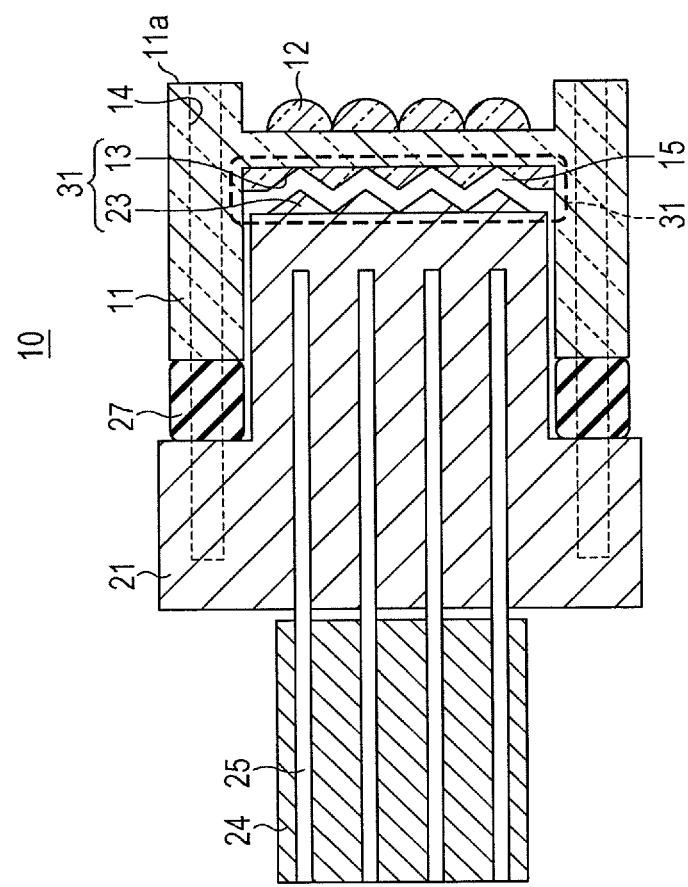

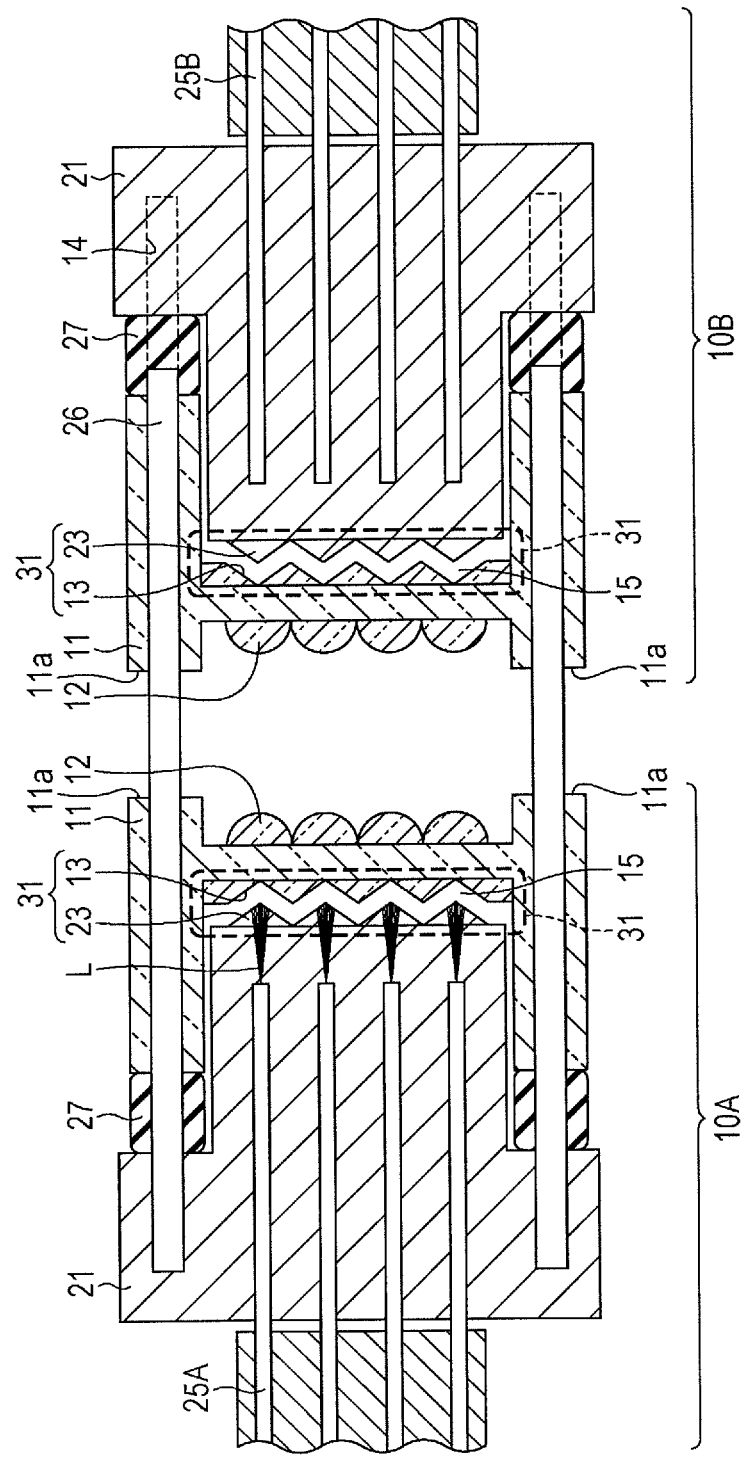

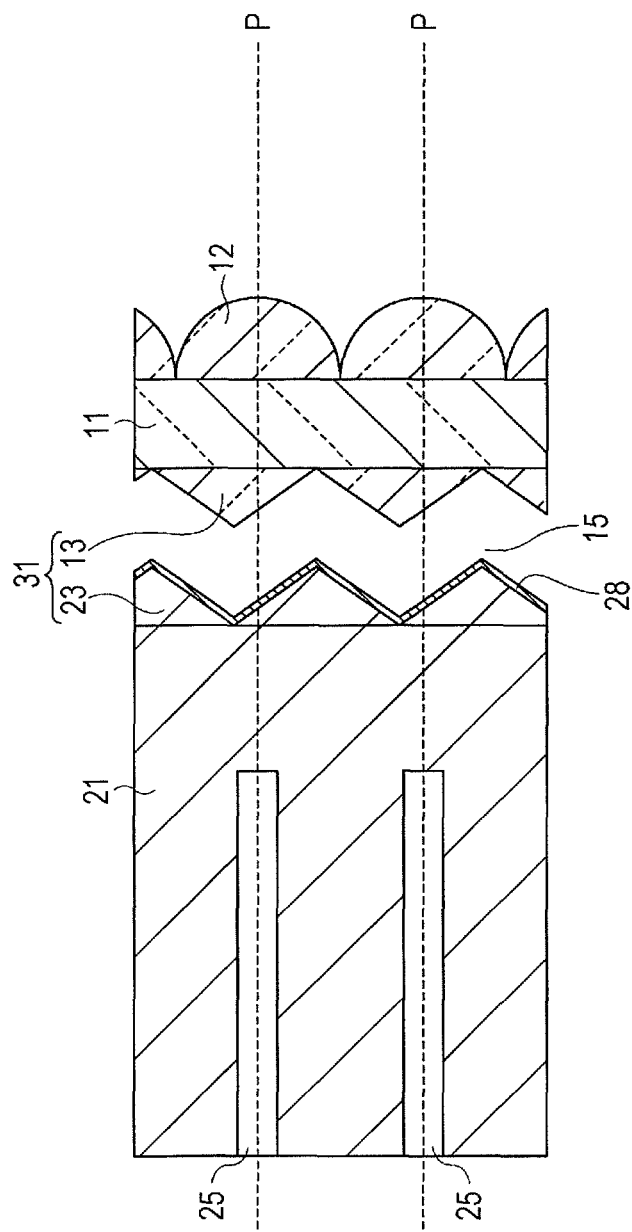

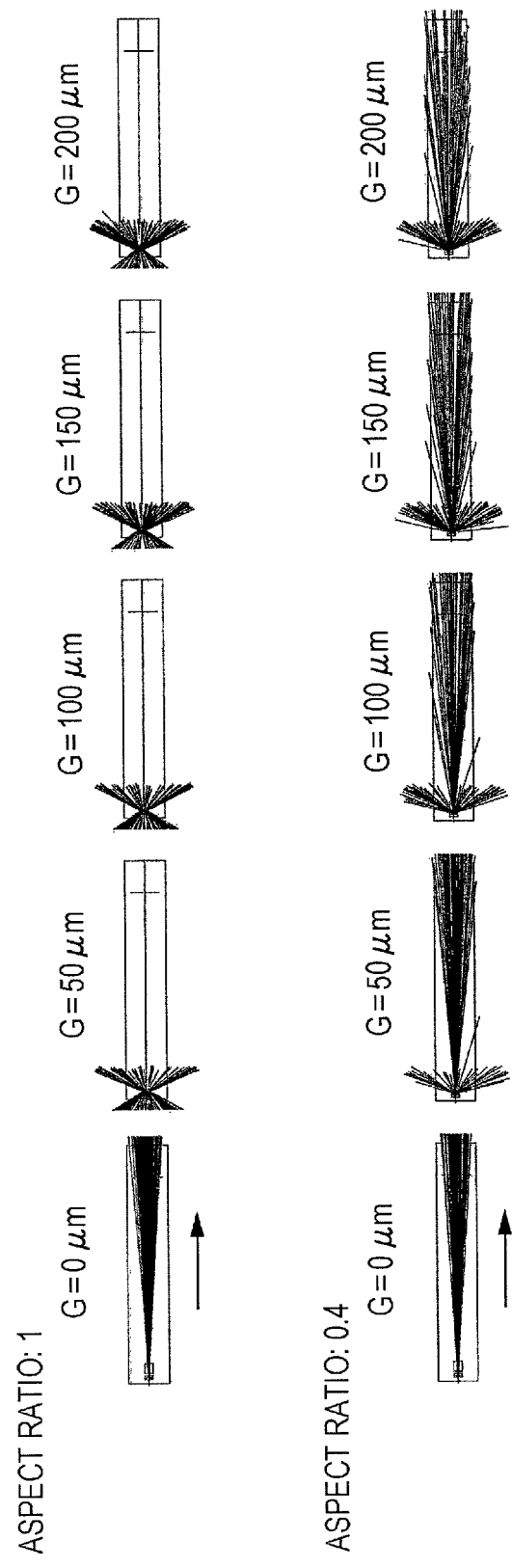

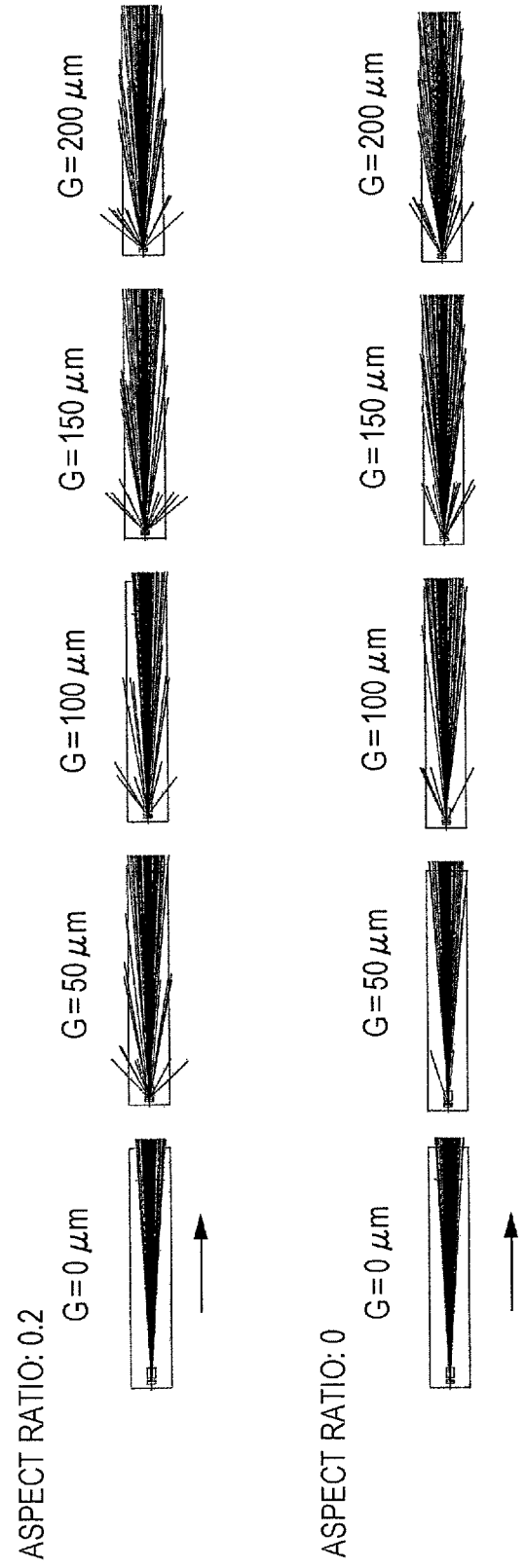

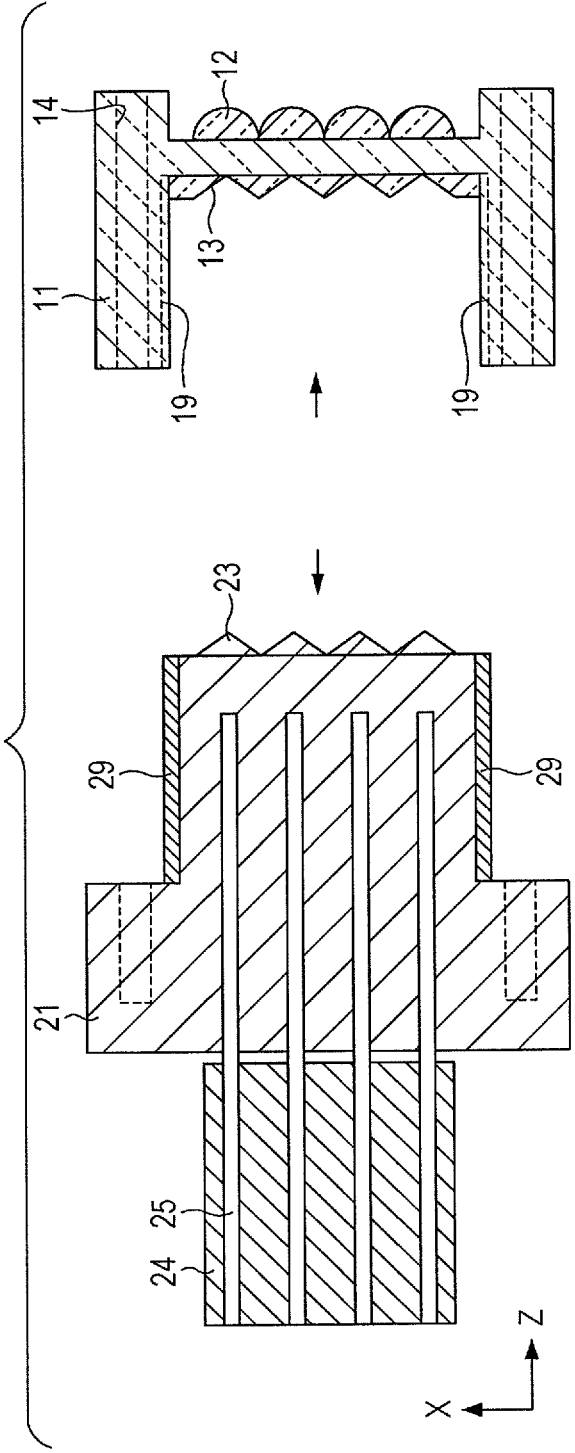
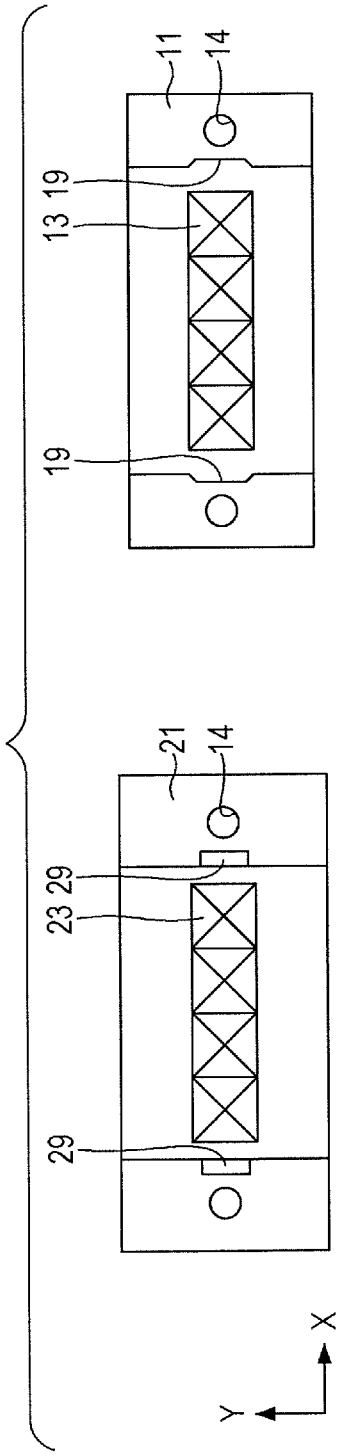
FIG. 9A
FIG. 9B

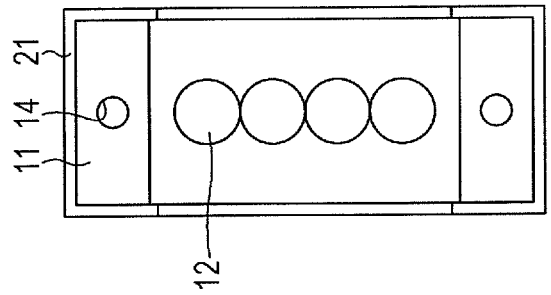
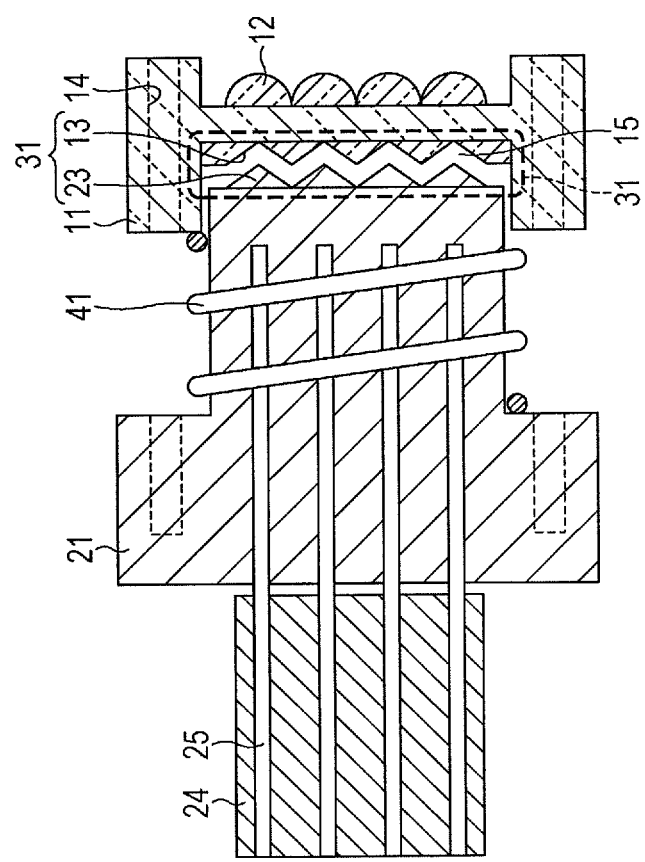
FIG. 10B
FIG. 10A

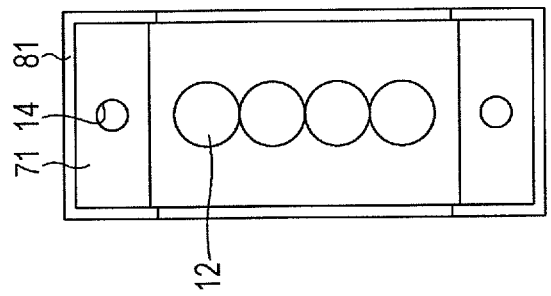
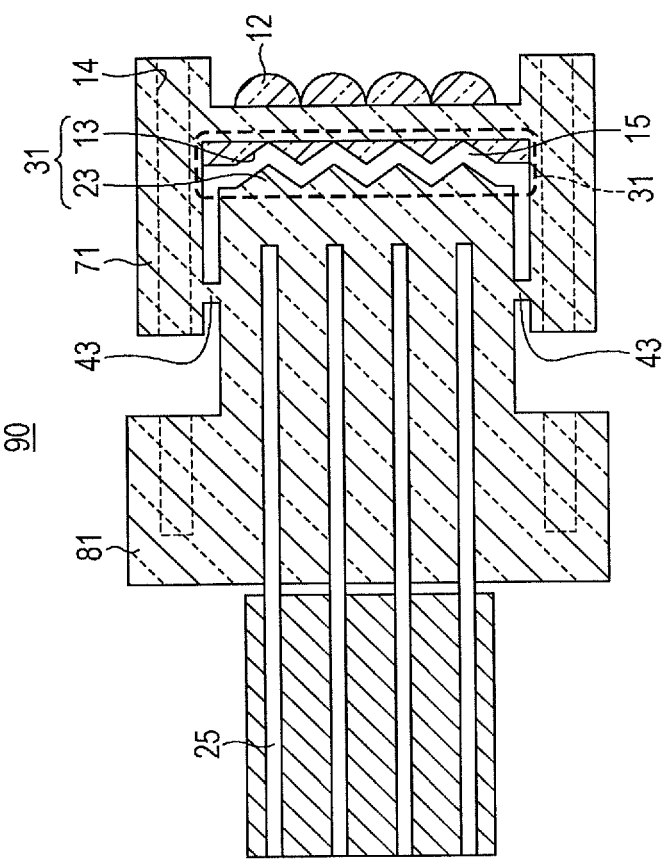

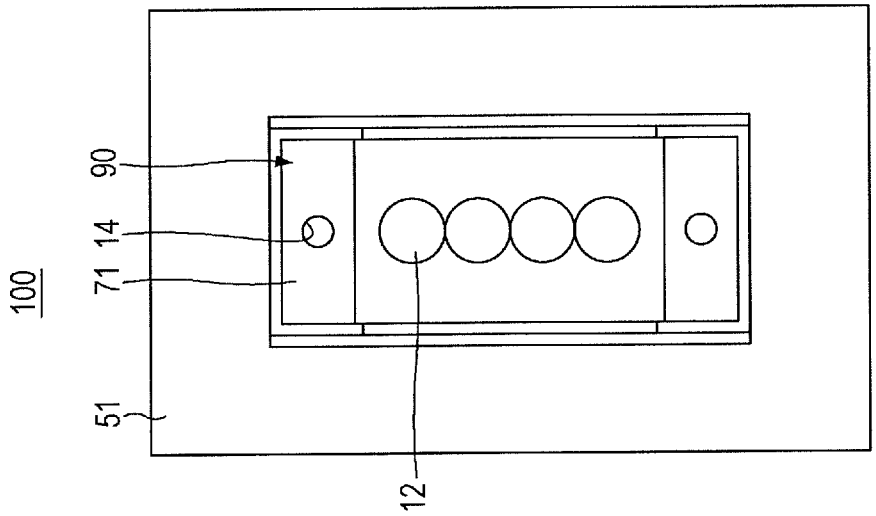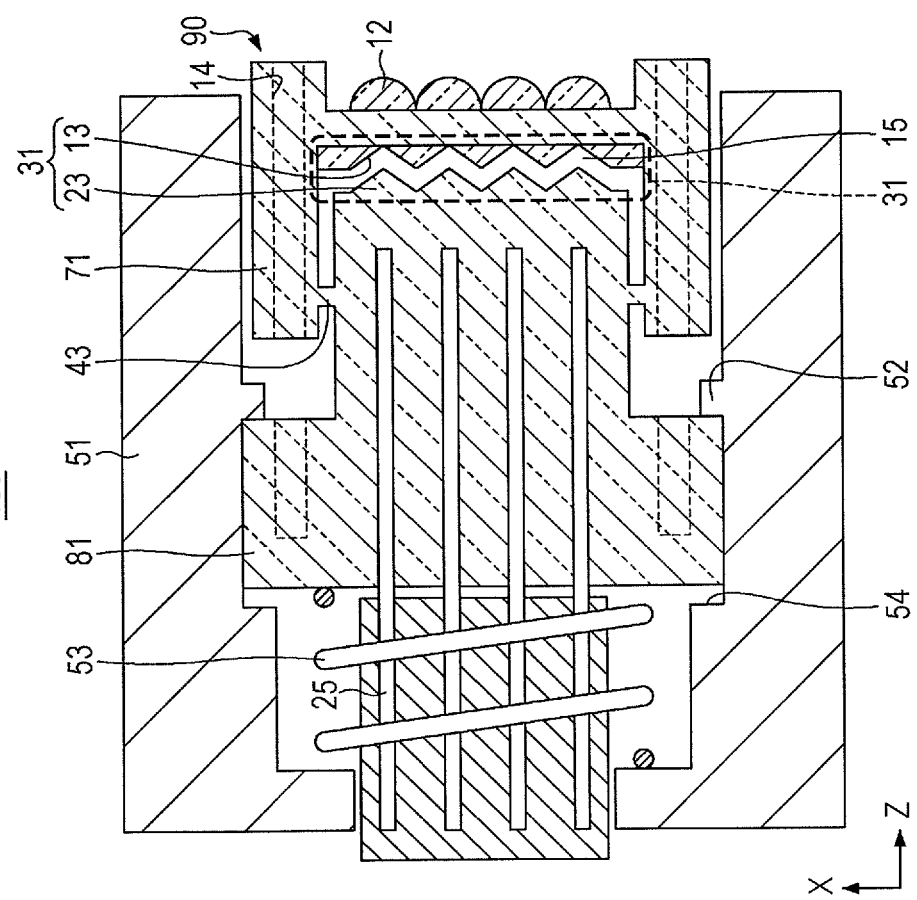

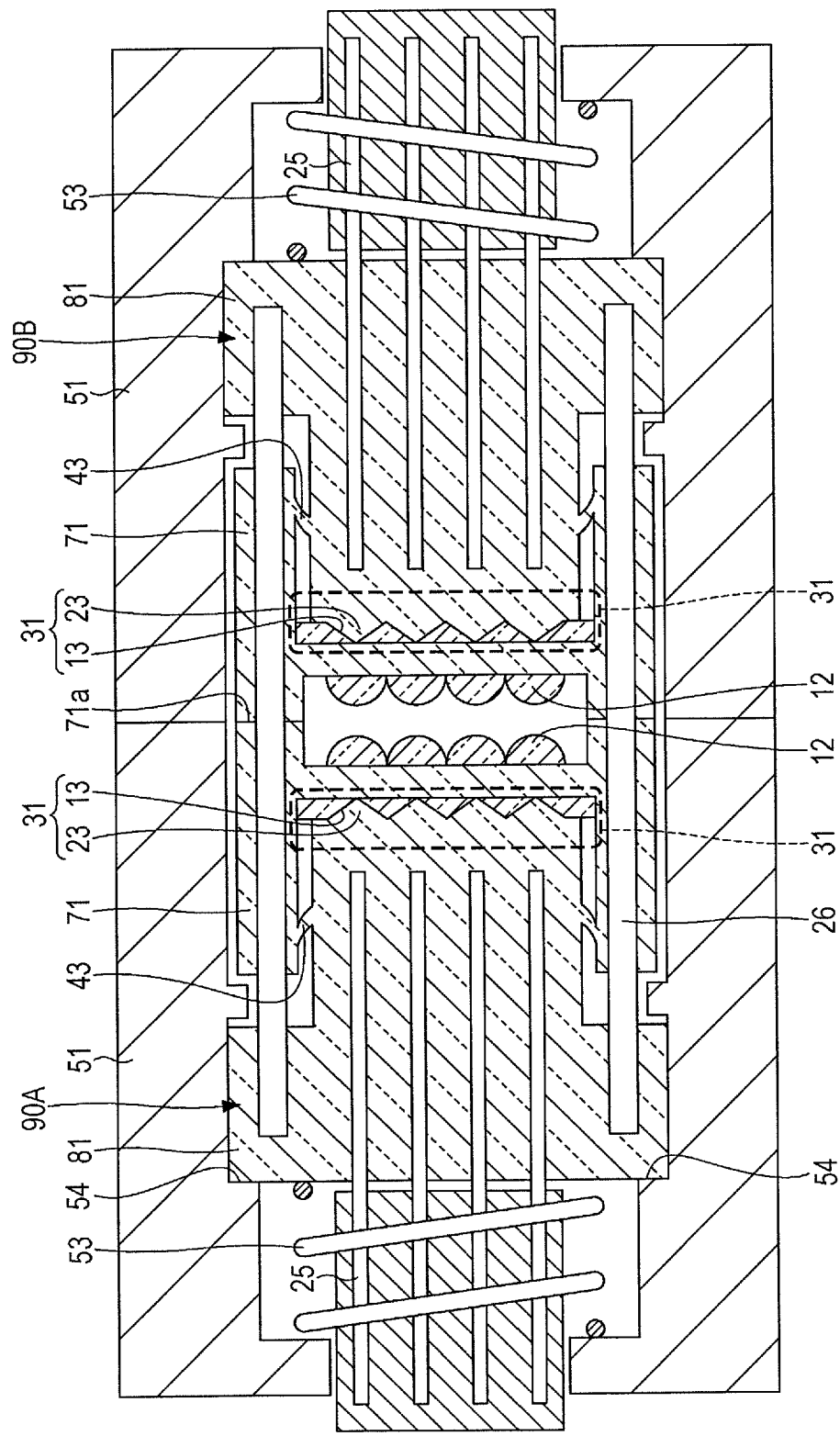

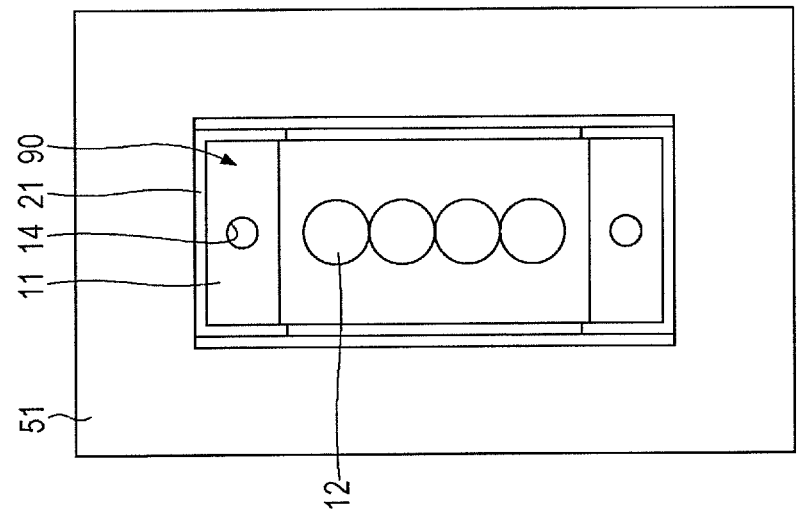
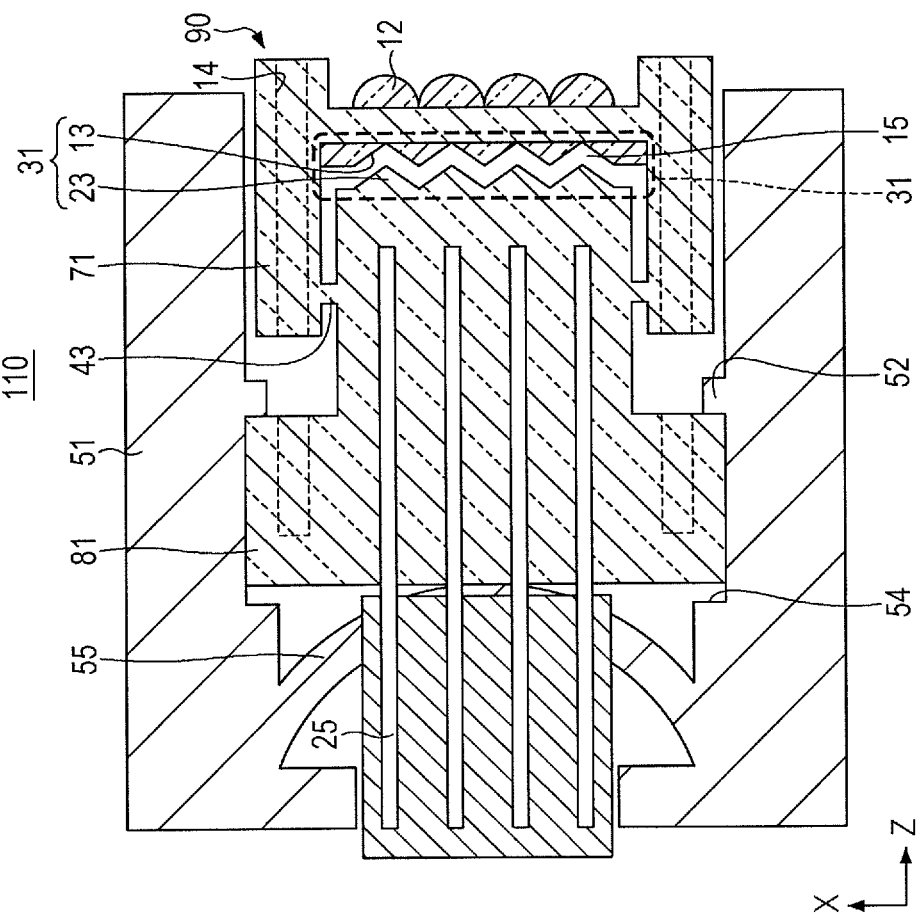
FIG. 13A
FIG. 13B

US 9,025,917 B2

OPTICAL CONNECTOR

CROSS-REFERENCE TO RELATED APPLICATION

This application is based upon and claims the benefit of priority of the prior Japanese Patent Application No. 2011-202444, filed on Sep. 15, 2011, the entire contents of which are incorporated herein by reference.

FIELD

The embodiment discussed herein is related to an optical connector.

BACKGROUND

In recent years, optical connectors employing lenses that optically couple optical transmission lines together are attracting attention. A microlens is disposed at a predetermined distance from the tip of an optical transmission line such as an optical fiber. Light exiting from the optical transmission line is enlarged in accordance with the numerical aperture thereof and is then collimated by the microlens and coupled with the microlens of an opposing connector. In such a lens-type optical connector, light is enlarged and then collimated. Thus, compared to a butt joint type optical connector such that the tips of optical transmission lines are butted against each other, the tolerance for misalignment between connectors is large. In addition, since optical transmission lines are not contacted, it is good in durability.

However, the lens-type optical connector that enlarges light and then collimates it has the following problem. When an optical connector is disengaged, collimated submillimeter-sized parallel light may enter the eyes of a user or worker (laser hazard). In particular, an optical signal for high-speed communication has a wavelength of 850 nm or more, and is invisible to the naked eye. At present, in order to reduce this risk, the connector housing is provided with a shutter. While the connector is engaged, the shutter is housed in the housing. When the connector is disengaged, the shutter is automatically lowered to suppress light leakage.

Particularly in the case of multifiber connectors, the same type of tape shaped optical transmission lines are often connected to perform transmission and reception. For this reason, the connectors on both sides have to be provided with shutters, and the connectors increase in size. In addition, conventional shutters provided in connectors are easily opened and closed with a finger, and thus the risk of laser hazard is not sufficiently removed.

There is known a structure for suppressing laser hazard such that a relay ferrule is disposed between an adapter and an optical connector. When the optical connector is disconnected, the lens of the adapter and the entrance end face of the relay ferrule are spaced a sufficient distance away from each other to suppress optical coupling. When the optical connector is connected, the relay ferrule is moved forward to the focal point of the lens along the optical axis. (See, for example, Japanese Laid-open Patent Publication No. 5-323151.)

SUMMARY

According to an aspect of the embodiments, an optical connector includes: a holding member that holds an optical transmission line; a lens member that has a lens; a concavo-convex structure provided between the holding member and the lens member; and a moving member that moves the concavo-convex structure between a first state where a protrusion and a recess of the concavo-convex structure are engaged with each other and a second state where a gap is formed between the protrusion and the recess.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A and 1B illustrate the basic configuration of an optical connector of an embodiment;

FIG. 2B illustrates a state where the optical connector of FIG. 1 is disengaged (the protrusions and recesses of the concavo-convex structure are disengaged from each other);

FIG. 4 illustrates an example in which the centers of engagement of the concavo-convex structure are offset from the optical axes;

FIG. 7A is a simulation diagram of the scattering state according to the aspect ratio and gap length of the concavo-convex structure;

FIG. 7B is a simulation diagram of the scattering state according to the aspect ratio and gap length of the concavo-convex structure;

FIG. 9A and 9B illustrate a first modification of the optical connector;

FIG. 10A and 10B illustrate a second modification of the optical connector;

FIG. 11A and 11B illustrate a third modification of the optical connector;

FIGS. 12A and 12B illustrate a first exemplary mounting of the optical connector in a housing;

FIG. 12C illustrates a state where optical connectors mounted in housings are engaged with each other; and FIG. 13A and 13B illustrate a second exemplary mounting of the optical connector in a housing.

DESCRIPTION OF EMBODIMENT

Figure 2A:
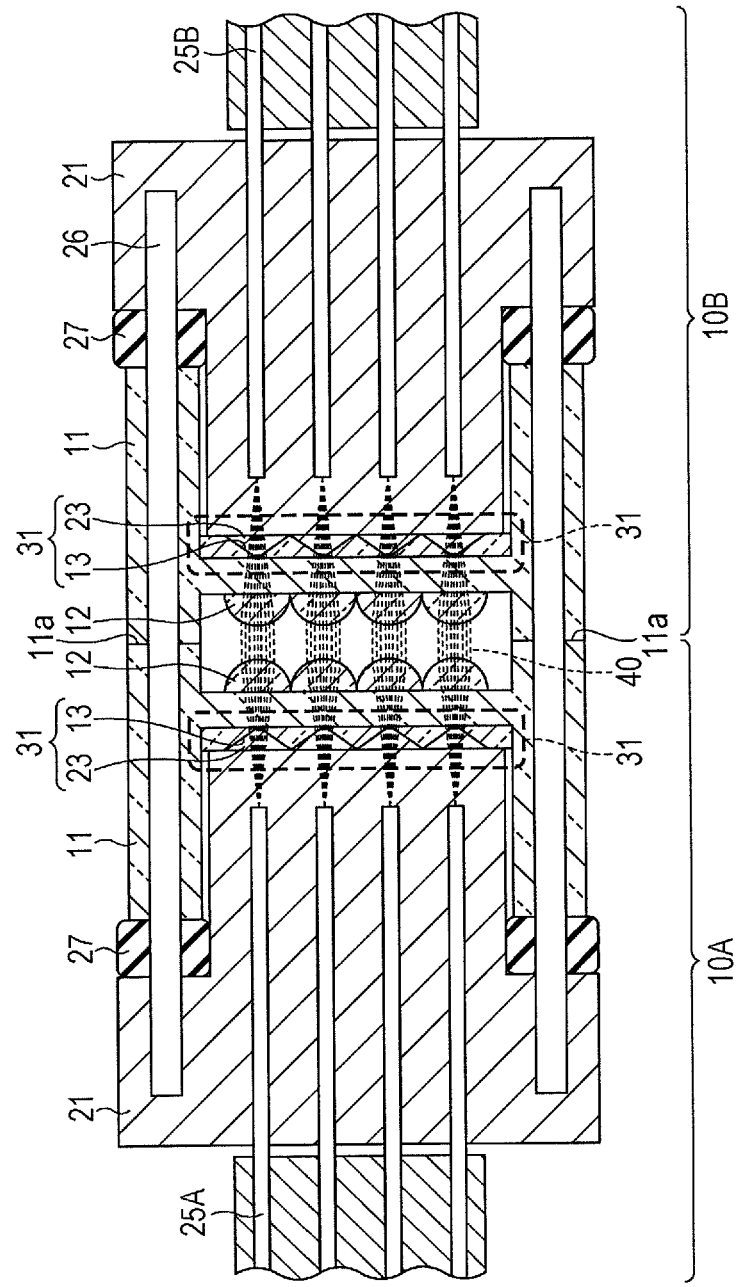
FIG. 2A illustrates a state where the optical connector of FIG. 1 is connected (the protrusions and recesses of the concavo-convex structure are engaged with each other)

FIGS. 1A and 1B illustrate the basic configuration of an optical connector 10 of an embodiment. The optical connector 10 has a ferrule (holding member) 21 holding optical transmission lines 25, a lens member 11 disposed at the tips of the optical transmission lines 25 and having lenses 12, a concavo-convex structure 31 provided between the ferrule 21 and the lens member 11, and a moving member 27 making the concavo-convex structure 31 movable between an engaged state and a disengaged state in accordance with the connection and disconnection of the optical connector 10.

The concavo-convex structure 31 includes protrusions 23 and recesses 13. When the optical connector 10 is not connected with a mating connector, the protrusions 23 and the recesses 13 are disengaged from each other, and a space (gap) 15 is formed therebetween. When the optical connector 10 is connected with the mating connector, the protrusions 23 and the recesses 13 are engaged with each other. In the example of FIG. 1(FIG. 1A and FIG. 1B), elastic bodies 27 such as rubber inserted between the ferrule 21 and the lens member 11 serve as moving members. When the optical connector 10 is connected with the mating connector, the elastic bodies 27 make the lens member 11 movable relative to the ferrule 21 in a direction along the optical axes of the optical fibers 25. As a result, as described later, the protrusions 23 and the recesses 13 of the concavo-convex structure 31 can be engaged with each other or disengaged from each other.

The optical transmission lines 25 are, for example, optical fibers 25. In the example of FIG. 1, four optical fibers 25 are covered with a tape 24. The tip of each optical fiber 25 is inserted into a slit formed in the ferrule 21, and is fixed at a predetermined position with adhesive or the like.

The lens member 11 has four microlenses 12 at positions corresponding to the four optical fibers 25. Each microlens 12 is located on the ferrule 21 side of a plane including the tip surface 11a of the lens member 11. The recesses 13 are formed in the surface of the lens member 11 opposite to the microlenses 12. The microlenses 12 and the recesses 13 may be formed of a light-transmitting material integrally with the lens member 11.

The ferrule 21 has the protrusions 23 at positions corresponding to the recesses 13 of the lens member 11. At least part of the ferrule 21 from the tips of the optical fibers 25 to the protrusions 23 is formed of a light-transmitting material. The protrusions 23 of the ferrule 21 and the recesses 13 of the lens member 11 are preferably formed of materials having the same refractive index.

Guide pin holes 14 are formed through the lens member 11, the elastic bodies 27, and the ferrule 21. By inserting guide pins into the guide pin holes 14, the positioning relative to the mating optical connector and the engagement of the protrusions 23 and the recesses 13 of the concavo-convex structure 31 are ensured.

FIG. 2A illustrates a state where an optical connector 10A is connected with a mating optical connector 10B and the protrusions 23 and the recesses 13 of the concavo-convex structure 31 of each optical connector are engaged with each other. The optical connector 10A and the mating optical connector 10B are positioned by guide pins 26. The tip surface 11a of the lens member 11 of the optical connector 10A and the tip surface 11a of the lens member 11 of the optical connector 10B are in contact with each other. Owing to the contact between the tip surfaces 11a of the lens members 11, the lens members 11 are pressed toward the corresponding ferrules 21. As a result, the elastic bodies 27 are compressed, and the lens members 11 move along the optical axes of the optical fibers 25 toward the corresponding ferrules 21. The protrusions 23 and the recesses 13 of the concavo-convex structure 31 of each optical connector are engaged with each other and the gap 15 disappears. In this state, the tip surfaces of the optical fibers 25 are located at the focal points of the corresponding microlenses 12.

In FIG. 2A, assume that an optical signal is transmitted from the optical connector 10A to the optical connector 10B. An optical signal exiting from the optical fiber 25A of the optical connector 10A passes through the engaging surfaces of the protrusions 23 and the recesses 13 while enlarging the diameter in accordance with the numerical aperture thereof, and is collimated by the microlenses 12. The collimated light propagates through the space between the optical connector 10A and the optical connector 10B and enters the microlenses 12 of the mating optical connector 10B. Also in the optical connector 10B, the protrusions 23 and the recesses 13 of the concavo-convex structure 31 are engaged with each other. The light collected by the microlenses 12 passes through the engaging surfaces of the protrusions 23 and the recesses 13, enters the optical fiber 25B, and propagates through the optical fiber 25B.

FIG. 2B illustrates a state where the optical connector 10A and the mating optical connector 10B are disconnected from each other. By separating the optical connector 10A and the optical connector 10B from each other, the lens members 11 are released from the pressing force. By the elastic force of the elastic bodies 27, the lens members 11 are moved away from the corresponding ferrules 21, and a gap 15 is formed in each concavo-convex structure 31. In this state, light rays exiting from the tip surface of the optical fiber 25A are scattered by the protrusions 23 and are not coupled to the microlenses 12. The reason that they are not optically coupled will be described later.

Figure 3A:
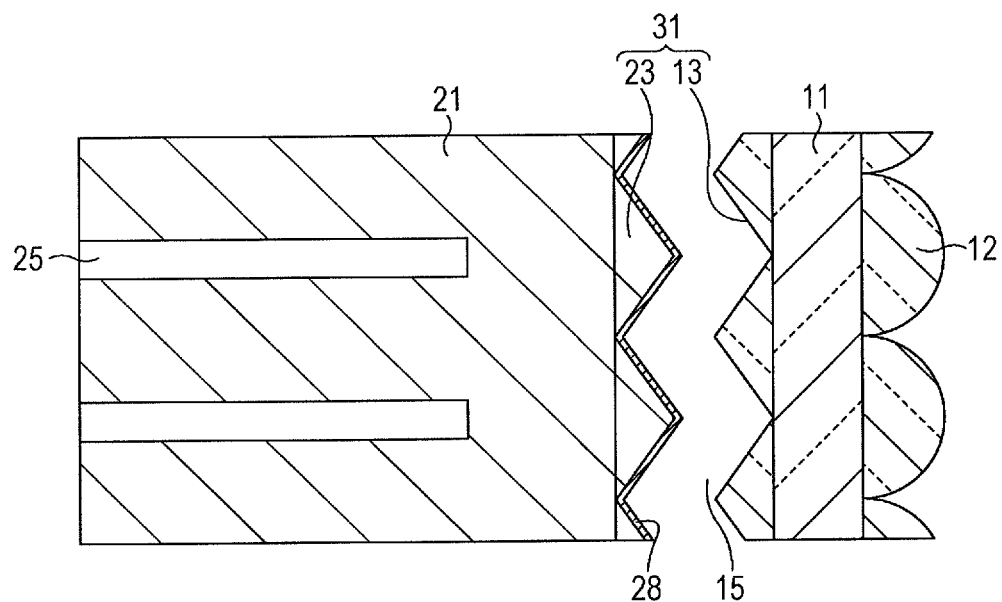
FIG. 3A to 3C illustrate an example of a concavo-convex structure (concave/convex)
Figure 3B:
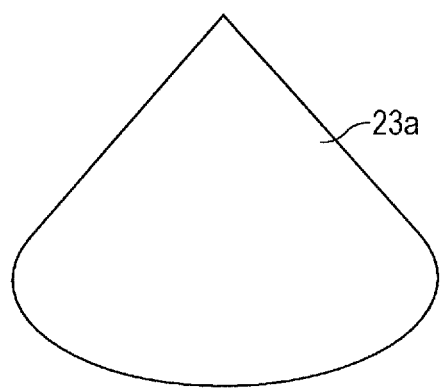
Figure 3C:
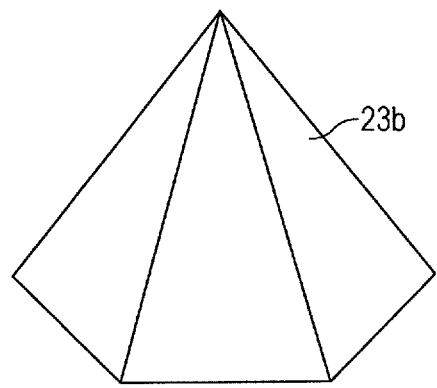

FIGS. 3A to 3C illustrate an example of a concavo-convex structure 31. As shown in FIG. 3A, protrusions 23 and recesses 13 corresponding thereto are engaged with each other at least so as to include the optical axes of the optical fibers 25. When the protrusions 23 and the recesses 13 are engaged with each other, the gap 15 therebetween disappears. Depending on the material of the ferrule 21 and the lens member 11, there may be roughness on the surfaces of the protrusions 23 and the recesses 13. In this case, a slight space remains between the protrusions 23 and the recesses 13 when they are engaged with each other. If an optical signal enters the engaging surfaces in this state, a desired optical coupling efficiency may not be obtained owing to the reflection from air. In order to suppress this, it is preferable to form an adhesion film 28 having a refractive index close to that of the ferrule 21 or the lens member 11, on the surface of the protrusions 23 or the recesses 13. The adhesion film 28 is, for example, matching oil, gel, or a transparent film. This can reduce the effect of the surface roughness.

FIG. 3B and FIG. 3C each illustrate an example of a protrusion 23. In FIG. 3B, the protrusion 23a is formed in a conical shape. In FIG. 3C, the protrusion 23b is formed in a pyramidal shape. Although not illustrated in FIG. 3B and FIG. 3C, the lens member 11 has recesses 13 formed therein in a shape corresponding to the conical protrusions 23a or the pyramidal protrusions 23b. As described later, these cones or pyramids (protrusions 23 and recesses 13) have an aspect ratio of a predetermined value or more. Depending on the angle between the outgoing light from the optical fibers 25 and the surfaces of the cones or pyramids, the optical coupling mode varies. When the incidence angle of an optical signal exiting from the optical fiber 25 on the surface of the cones or pyramids is smaller than the angle of total reflection, the surface of the cones or pyramids functions as an axicon lens, and the outgoing light from the optical fiber 25 is collected after exiting from the cones 23a or pyramids 23b and propagates toward the lens 12. Although the propagating light may not be coupled with the lens depending on the distance of the gap 15, the optically-coupled collimated light poses a laser hazard.

In contrast, when the aspect ratio of the protrusions 23 (and the recesses 13) are increased such that the incidence angle of outgoing light on the surface of the cones or pyramids is larger than the angle of total reflection, the outgoing light from the optical fiber 25 is multiply reflected in the cones 23a or pyramids 23b, and the light propagation toward the lens 12 does not occur. The result of simulation on this will be describe later with reference to FIG. 5 to FIG. 8.

FIG. 4 illustrates an example in which the centers of engagement of the concavo-convex structure 31 are offset from the optical axes P of the optical fibers 25. In a case where the protrusions 23 of the concavo-convex structure 31 are cones or pyramids as illustrated in FIG. 3B or FIG. 3C, the apex of each cone or pyramid (the center of engagement) does not necessarily have to be located on the optical axis P of the corresponding optical fiber 25. The reason is that as described above, when the protrusions 23 and the recesses 13 are engaged with each other at least so as to include the optical axes P, the outgoing light from the optical fibers 25 can be scattered by total reflection.

Figure 5A:
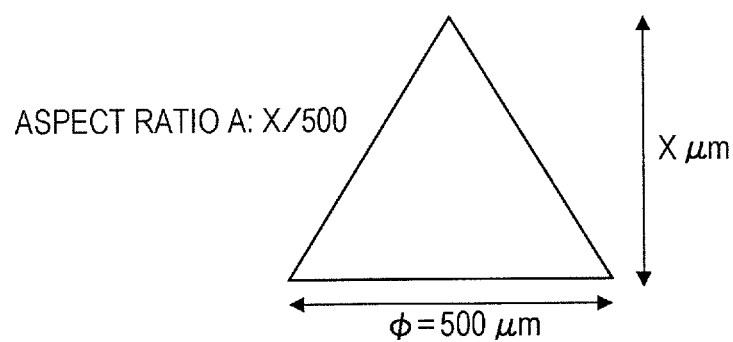
FIG. 5A and 5B illustrate the scattering effect of the protrusions of the concavo-convex structure.
Figure 5B:
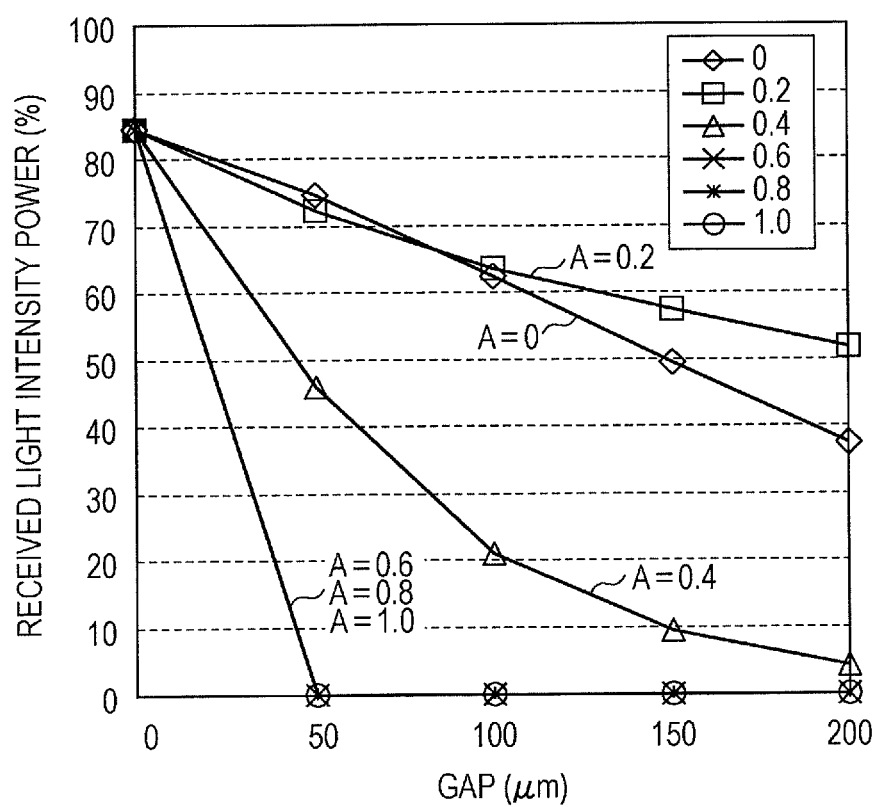

FIGS. 5A and 5B illustrate the scattering effect of the protrusions 23. The aspect ratio of the protrusions 23 was changed, and the scattering effect at that time was simulated. As illustrated in FIG. 5A, the protrusions 23 had a base diameter of 500 µm and a height of X µm. The aspect ratio A is expressed as X/500 (A=X/500). The height of the protrusions 23 and the distance of the gap 15 were changed, and scattering was calculated in various aspect ratios A and gap distances G. The conditions of simulation were as follows: the distance between the tip of an optical fiber 25 and the lens top of a corresponding microlens 12 was 1.25 mm, and light having a diameter of 7 mm was received at a distance of 100 mm from the microlens 12. Calculation was performed by a 3D ray-tracing method. All of the members were made of a transparent polyolefin material. The refractive index of this material is 1.53. The optical fiber 25 was a general multimode fiber having a core diameter of 50 µm. The radius of curvature of the microlens 12 was 440 µm.

As illustrated in FIG. 5B, when the aspect ratio A is zero and when the aspect ratio A is 0.2, 60% or more of light exiting from the optical fiber 25 is coupled to the microlens 12 and is collimated even when the gap 15 of the concavo-convex structure 31 is increased to 100 µm. This causes a serious laser hazard. Even when the gap 15 of the concavo-convex structure 31 is increased to 200 µm, collimated light having an intensity of about 50% of the outgoing light from the optical fiber 25 exits from the microlens 12.

In contrast, when the aspect ratio is 0.4, the intensity of the outgoing light can be reduced to 10% by increasing the gap 15 of the concavo-convex structure 31 to 150 µm. When the aspect ratio is 0.6 or more, the intensity of the outgoing light can be reduced to zero only by forming a gap of 50 µm in the concavo-convex structure 31. The reason is that forming a slight space causes multiple reflection in the cone, and light is not optically coupled to the collimator lens (microlens) 12.

Figure 6A:
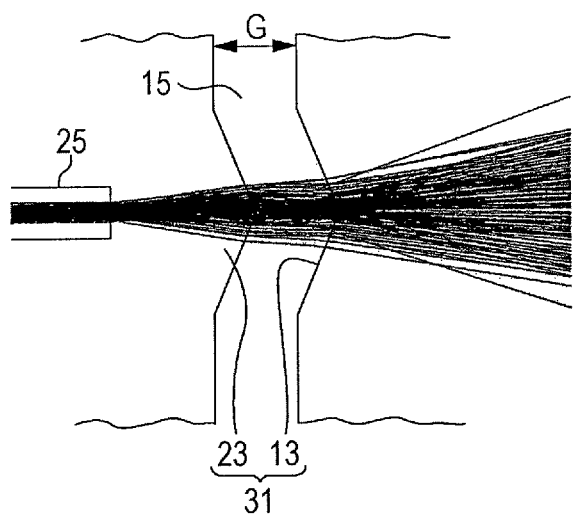
FIG. 6A to 6C illustrate a reduction in the optical coupling strength according to the aspect ratio of the protrusions or recesses of the concavo-convex structure.
Figure 6B:
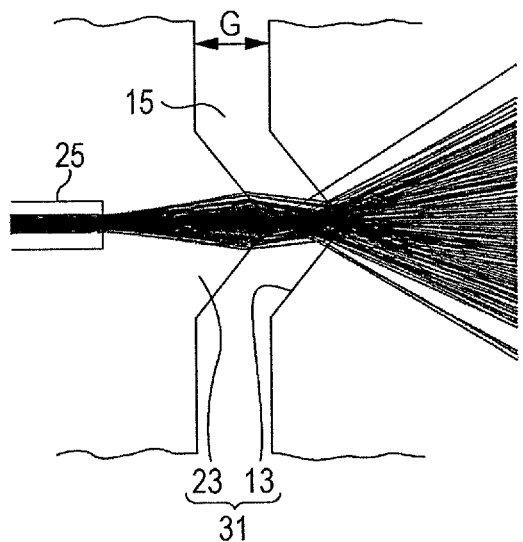
Figure 6C:
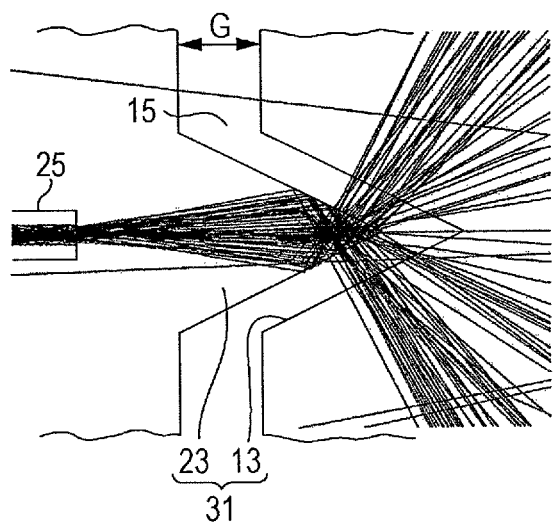

FIGS. 6A to 6C are diagrams each illustrating a coupling state according to an aspect ratio of the protrusion 23 and the recess 13. As illustrated in FIG. 6A, when the aspect ratio of the concavo-convex structure 31 is 0.2 or less, the number of rays coupled to the microlens (collimator lens) is large (the coupling strength is high) and collimated light is output to the outside when the optical connector is disconnected, even when the gap distance G is large. When the aspect ratio is 0.4 as illustrated in FIG. 6B, the number of rays decreases in accordance with the gap G. When G=150 µm, the intensity of the outgoing light can be reduced to 10%. In FIG. 6C, the aspect ratio is 0.6 or more. When the gap distance G is 50 µm or more, the optical coupling to the collimator lens is almost 0%. It is to be noted that because FIG. 6B and FIG. 6C are simulation diagrams, outgoing rays are depicted as if they were scattered beyond the recess 13, but these rays are scattered so as not to enter the microlens 12 and therefore optical coupling does not occur.

FIG. 7A and FIG. 7B are diagrams depicting the scattering state according to the aspect ratio and the gap distance G. As illustrated in FIG. 7A, when the aspect ratio A is 1.0, and when the gap G is 0 µm, that is, when the exit end of the optical fiber is located at the focal point of the microlens 12 (see FIG. 2A), light exiting from the end face of the optical fiber is collimated by the microlens and is propagated to the mating optical connector. When the gap G is 50 µm, most of the outgoing light from the fiber is totally reflected by the side surface of the protrusion (cone or pyramid) 23, and is not coupled to the lens. It is the same when the gap distance is increased to 100 µm, and 200 µm.

When the aspect ratio is 0.4, and when the gap distance G=0, the outgoing light from the fiber is enlarged and collimated and propagates to the mating connector. When the gap G is 50 µm, nearly 50% of the outgoing light is optically coupled to the collimator lens. When the gap G is 100 µm, the number of rays decreases to 20%. When the gap G is 150 µm, the number of rays decreases to 10% (see FIG. 5B).

As illustrated in FIG. 7B, when the aspect ratio is 0.2, and when G=0 µm, the outgoing light propagates to the mating optical connector. By increasing the gap G, the coupling strength can be reduced slightly. However, even when the gap G is increased to 200 µm, more than half of the rays are coupled to the collimator lens. When the aspect ratio is zero, that is, when there is no concavo-convex structure, the number of rays coupled to the lens can be reduced by increasing the gap G. However, even when G is increased to 200 µm, 40% or more of the outgoing rays become collimated light.

Figure 8A:
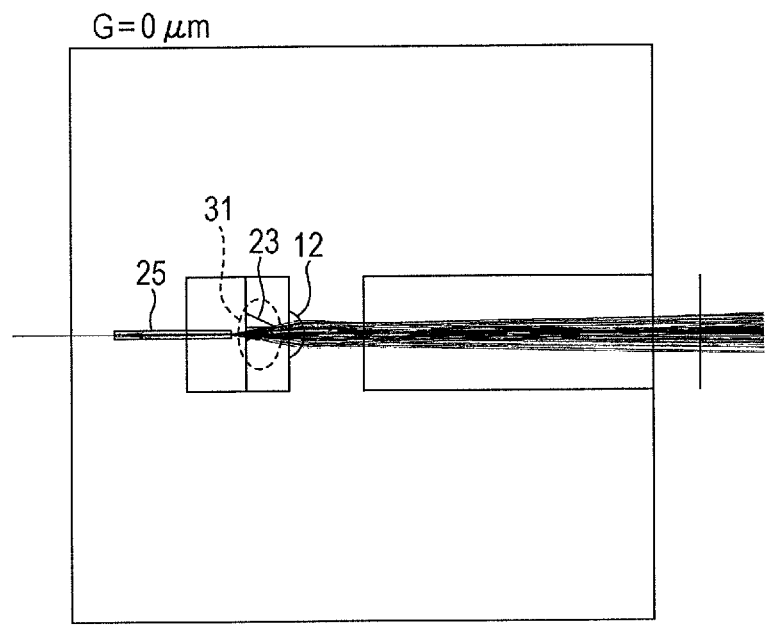
FIG. 8A and 8B are a simulation diagram illustrating the scattering effect in the offset configuration of FIG. 4.
Figure 8B:
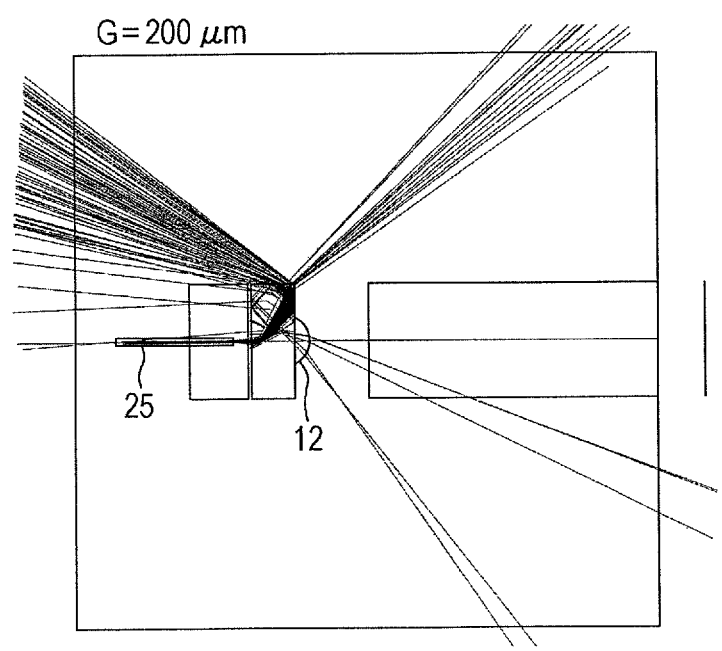

FIG. 8A and FIG. 8B illustrate the scattering effect of the concavo-convex structure in the offset configuration of FIG. 4. In this simulation, under the same conditions as those in FIG. 5, the height X of the protrusion 23 was set to 500 µm (aspect ratio A=1.0), the gap distance G of the concavo-convex structure 31 was set to 200 µm, and the apex of the protrusion 23 (the center of engagement) was offset from the optical axis P (see FIG. 4) of the optical fiber 25 by 125 µm. In FIG. 8A, the protrusion 23 and the recess 13 of the concavo-convex structure 31 are engaged with each other (gap distance G=0 µm), and light exiting from the optical fiber 25 is optically coupled to the microlens 12 and collimated. In FIG. 8B, by providing the concavo-convex structure 31 with a gap of 200 µm, almost all of the light is scattered and is not coupled to the microlens 12. As described above, if the optical axis of the optical fiber 25 is within the range of engagement of the concavo-convex structure 31, a scattering effect can be achieved at the time of disengagement.

FIGS. 9A and 9B illustrate a first modification of the optical connector 10 of FIG. 1. FIG. 9A is an exploded top plan view of a ferrule 21 and a lens member 11. FIG. 9B illustrate the engaging surfaces of protrusions 23 and recesses 13 as viewed from the direction of arrows of FIG. 9A. In the first modification, guide rails 29 are provided on the side surfaces of the ferrule 21, and guide rail grooves 19 are formed in the inner side walls of the lens member 11, and thereby a guide rail structure is added. When in use, as in FIG. 1, elastic bodies 27 are inserted between the ferrule 21 and the lens member 11. In this case, grooves receiving the guide rails 29 may be formed in the elastic bodies 27.

By providing the guide rails 29, the movement of the lens member 11 in the X direction and Y direction is restrained and smooth movement in the Z direction is achieved also in a connector not provided with pins. The positions of the optical fibers 25 and the microlenses 12 can be coarsely adjusted with the guide rails 29 and the guide rail grooves 19, and can be finely adjusted using the engagement of protrusions 23 and recesses 13 of the concavo-convex structure 31 (see FIG. 1). Thus, the exit end of each optical fiber 25 and the focal point of the corresponding microlens 12 can be aligned with a high degree of accuracy. In the first modification, as illustrated in FIG. 9B, quadrangular pyramid-shaped protrusions 23 and recesses 13 are used as a concavo-convex structure.

FIGS. 10A and 10B illustrate a second modification of the optical connector 10 of FIG. 1. In the second modification, a coil spring 41 is used as a moving member that moves the concavo-convex structure 31 between an engaged state and a disengaged state. The coil spring 41 may be used in place of the elastic bodies 27 of FIG. 1, or may be used in combination with the elastic bodies 27. When the optical connector is disconnected from the mating connector, a gap 15 is formed between the protrusions 23 and the recesses 13 of the concavo-convex structure 31 by the resilience of the coil spring 41. Thus, light exiting from each optical fiber 25 is scattered by the protrusion surface of the corresponding protrusion 23 and is not coupled to the corresponding microlens 12.

FIGS. 11A and 11B illustrate a third modification of the optical connector. In the optical connector 90 of the third modification, a ferrule 81 and a lens member 71 are formed integrally with each other, and are connected by flexible connecting portions 43. The connecting portions 43 are formed like thin flat springs and can be displaced and deformed. The connecting portions 43 make the lens member 71 movable relative to the holding member 81 in the optical axis direction. The ferrule 81, the lens member 71, and the connecting portions 43 can be made, for example, by injection molding.

FIGS. 12A and 12B illustrate a first exemplary mounting of the optical connector 90 of FIG. 11. As described with reference to FIG. 2A and FIG. 2B, the protrusions 23 and the recesses 13 of the concavo-convex structure 31 between the ferrule 81 and the lens member 71 can be engaged with each other by connecting the optical connector 90 with a mating connector. However, for practical use, it is preferable that the optical connector 90 be housed in a connector housing. So, in FIGS. 12A and 12B, a mounting structure 100 such that the optical connector 90 is housed in a connector housing 51 is provided.

When the optical connector 90 is housed in the connector housing 51, and when the optical connector 90 is disconnected, the tip of the lens member 71 protrudes from the tip of the connector housing 51. The connector housing 51 has, on the inner walls thereof, stoppers 52 and wall surfaces 54 that limit the movement of the ferrule 81 in the Z direction. The stoppers 52 limit the movement of the ferrule 81 so that the lens member 71 does not protrude from the connector housing 51 by a predetermined distance or more. The wall surfaces 54 limit the movement of the ferrule 81 so that the ferrule 81 is not excessively retracted into the connector housing 51 when the protrusions 23 and the recesses 13 of the concavo-convex structure 31 are engaged with each other. With the stoppers 52 and the wall surfaces 54, the ferrule 81 can be roughly positioned in the connector housing 51. In the connector housing 51, a coil spring 53 in contact with the rear end of the ferrule 81 is disposed. The coil spring 53 functions as a shock absorbing mechanism when the protrusions 23 and the recesses 13 of the concavo-convex structure 31 are engaged with each other, and functions as a pressing mechanism when the optical connector 90 is disconnected.

The protrusions 23 and the recesses 13 of the optical connector 90 are formed such that the aspect ratio thereof is 0.4 or more and preferably 0.6 or more. When the optical connector 90 is disconnected, a gap 15 is formed between the protrusions 23 and the recesses 13. Thus, when an optical signal is output from the exit end of each optical fiber 25, the optical signal is scattered by the protruding surface of the corresponding protrusion 23 and is not coupled to the corresponding microlens 12.

FIG. 12C illustrates the connected state of the optical connector 90 of FIGS. 12A and 12B. When the optical connector 90A is connected with the optical connector 90B, the tips of the connector housings 51 come into contact with each other, and thereby the tip surfaces 71a of the lens members 71 of the optical connectors 90A and 90B are moved backward so as to become flush with the tips of the connector housings 51. The tip surfaces 71a of the lens members 71 press each other, and thereby the flexible connecting portions 43 are bent, and the protrusions 23 and the recesses 13 of the concavo-convex structure 31 of each optical connector are engaged with each other. The ferrules 81 are also moved backward in the connector housings 51, but the movement thereof is limited by the wall surfaces 54. In this state, the exit end of each optical fiber 25 is located at the focal point of the corresponding microlens 12. When an optical signal propagates from the optical connector 90A to the optical connector 90B, light collimated by the microlenses 12 of the optical connector 90A is collected by the microlenses 12 of the optical connector 90B and is transmitted to the optical fibers 25.

FIGS. 13A and 13B illustrate a second exemplary mounting of the optical connector 90. In the second exemplary mounting, instead of the coil spring 53, the connector housing 51 has a housing spring 55. The housing spring 55 is made by shaping the inner wall of the rear end of the connector housing 51 like a flat spring. The housing spring 55 can also achieve the pressing function and impact absorbing function as in FIGS. 12A to 12C. That is, when the optical connector 90 in the connector housing 51 is engaged with a mating connector, the protrusions 23 and the recesses 13 of the concavo-convex structure 31 are engaged with each other, and the ferrule 21 is pushed toward the rear end of the connector housing 51. The housing spring 55 absorbs the impact when the ferrule 21 comes into contact with the wall surfaces 54. When the optical connector 90 is disconnected, the housing spring 55 returns the ferrule 21 and the lens member 11 to their original positions and thereby brings the concavo-convex structure 31 into a disengaged state.

As described above, according to the embodiment, a concavo-convex structure 31 is disposed between a lens member 11 (or 71) on which lenses are formed and a ferrule 21 (or 81) holding optical fibers 25. When the optical connector is disconnected, a gap 15 is formed between the protrusions 23 and the recesses 13, and the optical coupling efficiency of the optical fibers 25 and the lenses 12 is reduced. When the aspect ratio of the protrusions 23 and the recesses 13 of the concavo-convex structure 31 is a predetermined value or more, the total reflection condition of the outgoing light from the optical fibers 25 is satisfied, and the optical coupling efficiency can be reduced to almost zero. By disposing oil, gel, film, or the like having a refractive index close to those of the ferrule 21 and the lens member 11, the effect of the roughness of the surfaces of the concavo-convex structure 31 can be suppressed. By disposing a moving member that engages and disengages the protrusions 23 and the recesses 13 of the concavo-convex structure 31, between the lens member 11 and the ferrule 21, the movement between an engaged state and a disengaged state is ensured.

The present embodiment is not limited to the above-described configuration. The optical transmission line is not limited to a four-core optical fiber. Although, in the embodiment, a single-tier tape transmission line is used, a multi-tier multi-core tape transmission line can be used. In this case, the protrusions 23 of the ferrule 21 (81) and the recesses 13 of the lens member 11 (71) are formed in accordance with the number of fibers and the number of tiers of the multi-core tape transmission line. The shape of the protrusions and the recesses is not limited to a conical or pyramidal shape. The protrusions and the recesses can have any shape that can be engaged and satisfies the condition for the outgoing light from the optical fiber to be totally reflected by the protrusion surface. It goes without saying that in the first to third modifications and the first to second exemplary mounting, an adhesion layer such as matching oil, gel, or a film may be inserted between the protrusions 23 and the recesses 13 of the concavo-convex structure 31. Boots or the like used in common MT connectors or the like may be used. Any combination of the modifications and exemplary mounting is possible. In the first to third modifications and the first to second exemplary mounting, the optical axes and the centers of engagement may be offset from each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical connector, comprising:
   a holding member that holds an optical transmission line;
   a lens member that has a lens;
   a concavo-convex structure provided between the holding member and the lens member; and
   a moving member that reversibly moves the concavo-convex structure between a first state where a protrusion and a recess of the concavo-convex structure are engaged with each other and a second state where a gap is formed between the protrusion and the recess,
   wherein the protrusion and the recess of the concavo-convex structure are unengaged in the second state,
   wherein the gap is set to a predetermined length, and
   wherein the aspect ratio of the protrusion is set in a predetermined range.

2. The optical connector according to claim 1, wherein the concavo-convex structure is in the first state when the optical connector is connected with a mating connector, and is in the second state when the optical connector is not connected.

3. The optical connector according to claim 1, wherein the angle of incidence of light exiting from the optical transmission line on a surface of the protrusion satisfies the total reflection condition.

4. The optical connector according to claim 1, wherein the aspect ratio of the protrusion is 0.4 or more.

5. The optical connector according to claim 1, wherein an adhesion film that has a refractive index equal to or close to those of the holding member and the lens member is inserted between the protrusion and the recess.

6. The optical connector according to claim 1, wherein the center of the protrusion coincides with the optical axis of the optical transmission line.

7. The optical connector according to claim 1, wherein the center of the protrusion is offset from the optical axis of the optical transmission line.

8. The optical connector according to claim 1, wherein the protrusion of the concavo-convex structure is formed on a surface of the holding member facing the lens member, and the recess of the concavo-convex structure is formed in a surface of the lens member facing the holding member.

9. The optical connector according to claim 1, wherein the moving member is an elastic body inserted between the holding member and the lens member.

10. The optical connector according to claim 9, wherein the moving member includes a guide rail structure formed on side surfaces of the holding member and the lens member.

11. The optical connector according to claim 1, wherein the moving member includes a flexible connecting portion that is formed integrally with the holding member and the lens member and holds the lens member movably relative to the holding member in the optical axis direction.

12. The optical connector according to claim 11, wherein the moving member further includes an elastic body disposed in a housing that houses the optical connector, and in contact with the rear end of the holding member.

13. An optical connector, comprising:
    a holding member that holds an optical transmission line;
    a lens member that has a lens;
    a concavo-convex structure provided between the holding member and the lens member; and
    a moving member that reversibly moves the concavo-convex structure between a first state where a protrusion and a recess of the concavo-convex structure are engaged with each other and a second state where the protrusion and the recess of the concavo-convex structure are unengaged with each other,
    wherein the protrusion and the recess of the concavo-convex structure are unengaged with each other when they are separated by a gap of substantially predetermined length, and
    wherein the aspect ratio of the protrusion is set in a predetermined range.

14. An optical connector, comprising:
    a holding member that holds an optical transmission line;
    a lens member that has a lens;
    a concavo-convex structure provided between the holding member and the lens member; and
    a moving member that reversibly moves the concavo-convex structure between a first state where a protrusion and a recess of the concavo-convex structure are engaged with each other and a second state where a gap is formed between the protrusion and the recess,
    wherein the protrusion and the recess of the concavo-convex structure are unengaged in the second state,
    wherein the gap is set to a predetermined length,
    wherein the aspect ratio of the protrusion is set in a predetermined range, and
    wherein the angle of incidence of light exiting from the optical transmission line on a surface of the protrusion satisfies the total reflection condition.

* * * * *